United States Patent
Barker

[15] 3,661,513
[45] May 9, 1972

[54] MANUFACTURE OF ALKALI METAL PHOSPHATES

[72] Inventor: James E. Barker, Freehold, N.J.
[73] Assignee: Cities Service Company, New York, N.Y.
[22] Filed: Aug. 14, 1970
[21] Appl. No.: 63,948

[52] U.S. Cl.................................................23/107, 71/43
[51] Int. Cl.................C01b 25/28, C01b 25/30, C01b 25/38
[58] Field of Search.......................23/107, 165, 165 C, 106; 71/43

[56] References Cited

UNITED STATES PATENTS

| | | | |
|---|---|---|---|
| 3,328,118 | 6/1967 | Sasakura | 23/107 |
| 3,458,282 | 7/1969 | Koerner et al. | 23/165 |

FOREIGN PATENTS OR APPLICATIONS

| | | | |
|---|---|---|---|
| 779,429 | 9/1958 | Great Britain | 23/107 |

OTHER PUBLICATIONS

Agers et al. Purification of Inorganic Acids by the Amine Liquid Ion Exchange Process (1963) p. 1–4

Primary Examiner—Oscar R. Vertiz
Assistant Examiner—Gregory A. Heller
Attorney—J. Richard Geaman

[57] ABSTRACT

Alkali metal phosphates can be prepared directly from phosphoric acid and an alkali metal salt. Contaminating anions can be selectively extracted from the resulting solution with an immiscible organic amine, such as a secondary aliphatic amine. The alkali metal phosphates can be converted to polyphosphates, such as tripolyphosphate. The alkali metal phosphates and polyphosphates are useful in detergents and fertilizers.

10 Claims, No Drawings

MANUFACTURE OF ALKALI METAL PHOSPHATES

BACKGROUND OF THE INVENTION

This invention relates to an improvement in the preparation of alkali metal phosphates. Alkali metal phosphates and polyphosphates are important industrial chemicals used in detergents and other products. They are normally made by reacting phosphoric acid with an alkali metal hydroxide or carbonate. The naturally occurring alkali metals, however, such as sodium and potassium, are most commonly mined and recovered as a salt, such as the chloride. Thus, in order to react phosphoric acid with an alkali metal hydroxide or carbonate, the alkali metal salt must first be converted to the corresponding hydroxide or carbonate. It is thus readily apparent that a process for preparing alkali metal phosphates which employs the alkali metal salt directly, eliminating expensive intermediate processing, would be a highly desirable and economically attractive process.

The primary reaction between an alkali metal salt, such as, for example, the chloride, and phosphoric acid results in an alkali metal phosphate, such as $NaH_2PO_4$, and a protonated anion, such as hydrogen chloride. The prior art practice of heating this mixture results in expulsion of hydrogen chloride and dehydration of orthophosphate to form the metaphosphate salt $NaPO_3$. Further, this system is extremely corrosive at the temperatures necessary to expel the hydrogen chloride. The corrosion problem is one which has not been readily overcome, and, due to the corrosion, impure metal phosphates are formed, suitable only for agricultural purposes. These and other problems of the prior art have been overcome by my invention, as described in greater detail below.

SUMMARY OF THE INVENTION

It has been found that alkali metal phosphate salts can be directly prepared from phosphoric acid and an alkali metal salt. More particularly, alkali metal phosphate salts characterized by a reduced anion content can be prepared by dissolving an alkali meal salt in phosphoric acid and treating the solution obtained with an immiscible organic amine to selectively extract the contaminating anion. The solution recovered has a reduced anion content and has a pH of about 7. On evaporating the so-treated phosphate solution, solid alkali metal phosphate salts can be recovered. In another aspect of this invention the solution can be treated with additional base and dried and calcined to yield tripolyphosphate salts.

As used herein, the term "anion" means the anion component of the alkali metal salt added to the phosphoric acid. Thus, if sodium nitrate is added, the nitrate ion is the anion that is selectively extracted from the acidic mixture. The term "anion" does not include the phosphate ion.

One advantage of the invention is that alkali metal salts can be directly reacted with phosphoric acid to yield a desired alkali metal phosphate, or mixture thereof. A second advantage is that the alkali metal phosphate which is recovered is substantially free of contaminating anions, and is so rendered without the use of the high temperatures of the prior art. A further advantage is that the alkali metal phosphate solution obtained after extraction with an immiscible organic amine is a substantially neutral solution having the approximate composition $M_{1.5} H_{1.5} PO_4$, where M is the alkali metal, ideally suited for the manufacture of tripolyphosphate salts, as will be discussed below. The immiscible organic phase containing the amine-anion reaction product can be regenerated according to well-known procedures and the free amine recycled for further use in the extraction step.

The use of the amine extractant allows the formation of some dibasic phosphate, as in this representative equation:

(1)  $2H_3PO_4 + 3KCL \rightarrow KH_2PO_4 + K_2HPO + 3HCL$ 

This system results in the formation of approximately equimolar amounts of the phosphates.

Although a wide variety of alkali metal salts is useful within the scope of the present invention, the economics of the overall process dictate that the less expensive salts are preferable. Any of the common alkali metals, including lithium, sodium, potassium, rubidium and cesium, can be used in this process. However, sodium and potassium are preferred due to their wider occurrence and availability. For the anion portion of the salt, halides, such as chloride, bromide, and iodide, and nitrate and sulfate ions can be used. Other anions can be used, provided that the protonated form be more reactive toward the amine extractant than is phosphoric acid since, in the acid form, these anions react with the amine extractant and are thus effectively removed from the solution. The chlorides are commercially available compounds, and chloride is therefore the preferred anion, although the other halides, as well as nitrate and sulfate, can be used. Thus, such inexpensive and readily available alkali metal salts as sodium chloride and potassium chloride are particularly preferred.

The phosphoric acid with which the alkali metal salt is contacted can come from any convenient source and its composition can vary over a rather substantial range. Convenient sources of phosphoric acid are furnace acid and wet process phosphoric acid. The concentration of phosphoric acid can similarly vary over a considerable range. Thus, the concentration of feed phosphoric acid can range from as low as about 5 to about 62 weight percent $P_2O_5$. A 5 percent concentration is somewhat dilute and requires additional processing, such as the removal of water, of the final solution of the formed alkali metal phosphate. A 62 percent concentration is characteristic of the product obtained from the oxidation of phosphorous and hydration of the resulting $P_2O_5$. Products having a $P_2O_5$ content above 62 percent are not readily available and, although useful, are not preferred. Feed acids of this concentration are preferably diluted for better reactivity. It is generally preferred to employ a phosphoric acid having a concentration of from about 15 to about 35 percent $P_2O_5$. In this range the solubilities of the reactants and the products formed are at a maximum.

The alkali metal salt and the phosphoric acid can be combined and mixed in any convenient manner. In one embodiment these components can be contacted by agitation. In a preferred embodiment the mixing of these reactants is accomplished by mixing in the presence of the extractant as in a mixer-settler arrangement. For example, the solubility of KCl in 30 percent $P_2O_5$ acid is about 6 percent. Thus, if the salt, acid and amine extractant are mixed together, the amine reacts with the HCl formed, promoting the dissolution of additional salt. The salt can be added in various physical forms. For example, solid alkali metal salt having a particle size in the general range of from about 325 mesh to about 20 mesh can be added to the acid. If the particles are much finer than 325 mesh, dusting problems arise. If the particles are larger than about 20 mesh, the rate of solution of the salt in the acid is lowered, thus limiting the throughput. Alternatively, a slurry of alkali metal salt — $H_2O$ can be used in the mixer-settler. If a concentrated acid is used, an aqueous solution of the salt can be added, thus introducing the salt and diluting the acid so that it is able to hold more alkali metal phosphate in solution.

The temperature at which the alkali metal salt and the phosphoric acid can be contacted is not critical and can vary over a rather broad range. Thus, the temperature can range from about 0° to about 100° C., preferably from about 40° to 75° C. It is obvious that, as a general rule, at lower temperatures the reaction will be somewhat sluggish while at higher temperatures one may encounter problems of corrosion and/or undesirably vigorous reaction.

Following the reaction of alkali metal salt with phosphoric acid, the reaction mixture is contacted with an immiscible organic amine, to selectively extract the anion. A wide variety of amine extractants can be used in this extraction process. These extractants are, in general, secondary or tertiary amines, particularly those containing hydrocarbon groups of approximately six to 24 carbon atoms, such as tricaprylamine and 1-dinonylamino-2-dodecanol. The amines are generally aliphatic in character although they may be partially aromatic. The aliphatic hydrocarbon groups can be straight chained or branch chained, saturated or unsaturated. In addition, it is possible to use an amine containing one or more branch chained alkyl groups and/or one or more straight chained alkyl groups. Typical amines which may be used for this purpose are represented by the following formula:

(2) 

in which $R_1$ is an aliphatic hydrocarbon group having a tertiary carbon atom at the point at which it is attached to the nitrogen atom. The substitutents attached to this tertiary carbon atom are alkyl groups totaling from eleven to fourteen carbon atoms in the three alkyl groups. $R_2$ is a straight chain, saturated alkyl group containing from about eight to about 14, preferably about 12, carbon atoms. Compounds of this type are commercially available on the market.

Other suitable amines can be represented by the formula:

(3) 

in which $R_1$ is as above described and $R_3$ is the group ----:

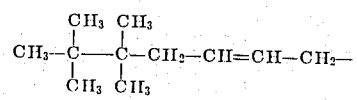

Compounds of this type are readily available on the market.

The above amine extractants are liquid. In another embodiment of this invention, the extractant can be present in the form of an anion exchange resin, in which amine groups are attached to a resin backbone. Such exchange resins are stable solids and can be used in bed form. Such use eliminates phase separation operations encountered with the liquid amines.

Additionally, many amine compounds which are suitable within the scope of this invention will be immediately apparent to those skilled in the art. The nature of the amine employed is not critical. However, the amine is desirably oil soluble and both the amine selected and its salts should be water insoluble, since they are employed in a water-immiscible organic phase. In general, the total carbon content of the amine can vary from about 22 to about 60 carbon atoms, in which at least one chain contains from about six to about 24 carbon atoms.

Insofar as the selected liquid amine and its salt are compatible with many organic solvents, the selection of a diluent for the amine is primarily a matter of convenience. Kerosene has been found to a to be a highly satisfactory solvent. However, the diluent can be selected from any wide variety of materials such as aromatic, naphthenic or aliphatic hydrocarbons, or a chlorinated solvent or other nonreactive solvents such as chloroform, benzene and the like. When dispersed in a solvent, the amine concentration can vary broadly from as low as 1 percent to as much as about 99 percent preferably from about 10 to about 20 percent. If the amine concentration is much lower than 10 percent, the increased dilution requires more and/or larger sized equipment for a given throughput. If the concentration is much over 20 percent, physical losses of the amine increase.

The quantity of the amine employed can vary over a broad range. The preferred amount of amine is that which will react stoichiometrically with the anion formed. Excess amine will react with phosphoric acid, resulting in loss of phosphate values. If less than the stoichiometric amount of amine is used, some of the protonated anion will not be removed, leaving contaminating anions in the solution.

Subsequent to extraction, the amine extractant can be regenerated with a basic medium, such as sodium carbonate, sodium hydroxide, ammonium hydroxide or even dry ammonia gas. It is frequently convenient to use a lime or magnesia slurry. From an economic consideration, a slurry of lime and water is particularly desirable to regenerate the free amine, which can be recycled fro further extraction. The brine obtained on regenerating the organic amine with lime and water is usually discarded.

There are various methods available for contacting the amine extractant with the alkali metal phosphate solution. One of the more convenient methods is countercurrent extraction, preferably using more than one stage for more complete extraction. These contacting techniques are well known and will not be described further.

The phosphate solution effluent from the extraction step is substantially neutral and has the approximate composition $M_{1.5}H_{1.5}PO_4$, where M is the alkali metal. This solution can be used as feed for tripolyphosphate production, or it can be dried or concentrated and crystallized, according to methods well-known in the art. Thus, simple evaporation of the potassium form of the solution gives a solid phosphate available, for example, for blending in a fertilizer.

In one embodiment, an overall process for forming an alkali metal phosphate can operate as follows:

Alkali metal salt, phosphoric acid and water are combined in a solution tank in the proportions to yield the desired product in solution after extraction of the anion. After suitable reaction, the solution is moved to a mixing unit where a suitable quantity of immiscible organic amine is added, mixed and allowed to extract the anion. Following the extraction, the phases are separated, as by centrifuging, the amine salt phase being removed therefrom for regeneration. The aqueous product solution phase is removed from the centrifuge and dried to yield the desired alkali metal phosphate product. The immiscible mixture of organic amine-anion is directed to a liming tank wherein it is contacted with a slurry of calcium oxide and water to regenerate the amine. The mixture is then centrifuged, and the phases are separated. The brine is sent to waste, and the immiscible organic amine is recycled.

In another aspect of this invention the mixture to mono-and di-alkali metal phosphates, prepared as described above, can be converted to the corresponding alkali metal tripolyphosphate salts. As will be described more completely below, this is accomplished by adding an appropriate base to the solution and drying and calcining the product. One advantage obtained by the practice of this aspect of the invention is that far less base is required than is the case when conventional routes to tripolyphosphate salts are taken.

Tripolyphosphates salts are conventionally prepared by neutralizing phosphoric acid with, for example, an alkali metal base:

(5) $3H_3PO_4 + 5KOH \rightarrow 2K_2HPO_4 + KH_2PO_4 + 5H_2O$ and then calcining the product:

(6) $2K_2HPO_4 + KH_2PO_4 \longrightarrow K_5P_3O_{10} + 2H_2O$

It will be noted that the ratio of di-alkali metal phosphate to mono-alkali metal phosphate required for formation of tripolyphosphates is 2:1.

By the practice of this invention it is possible to prepare alkali metal tripolyphosphate salts using far less alkali metal base than was previously possible. Thus, phosphoric acid, when treated with an alkali metal salt in the manner previously described yields an approximately equimolar solution of mono-and di-alkali metal phosphates, according to the equation:.

(7) $2H_3PO_4 + 3KCl \rightarrow KH_2PO_4 + K_2HPO_4 + 3HCl$

Following extraction with an immiscible organic amine, the solution is desirably treated with an alkali metal base to alter the ratio of alkali metal phosphates according to the following equation:

(8) $3K_2HPO_4 + 3KH_2PO_4 + KOH$
$\rightarrow 4K_2HPO_4 + 2KH_2PO_4 + H_2O$

The alkali metal base, in this case KOH, reacts with available protons in the dihydrogen phosphate to form monohydrogen phosphate, thus altering the ratio of these salts. A strong base, or source of hydroxyl ions, is needed for this reaction, and the alkali metal hydroxides and carbonates are useful. The alkali metal base added is usually selected to correspond to the alkali metal of the salt, but a different alkali metal base can be used.

The alkali metal tripolyphosphate salts can, of course, be prepared in the manner exemplified by equation 6. That the practice of this invention results in a considerable saving with respect to the alkali metal base can be seen from the following equation, which represents the sum of equations 7 and 8:

(9) $6H_3PO_4 + 9KCl + KOH$
$\rightarrow 4K_2HPO_4 + 2KH_2PO + 9HCl + H_2O$

The practice of this aspect of the invention is quite simple. Thus, in one embodiment, the aqueous product solution, following extraction with the amine, is treated with sufficient alkali metal base so that the desired 2:1 ratio of alkali metal phosphate salts is obtained. The reaction is exemplified by equation 8, above. After drying, the salts can be calcined to yield the desired tripolyphosphate salts.

DESCRIPTION OF THE PREFERRED EMBODIMENTS

EXAMPLE 1

23.8 parts of phosphoric acid (61.5% $P_2O_5$, furnace grade acid), 24.4 parts of KCl (20 to 60 mesh) and 70 parts of water are mixed together, forming a slurry. This slurry is extracted with 830 parts of a 15 percent solution of an amine in kerosene in a three-stage countercurrent system, the amine having the general formula $R_1 R_2 NH$, with $R_1$ being an aliphatic hydrocarbon group containing a tertiary carbon atoms, with alkyl group substutients attached thereto and totalling from 11 to 14 carbon atoms in the three alkyl groups. $R_2$ is a straight chain, saturated alkyl group containing 12 carbon atoms. A compound such as this is sold by Rohm and Haas Company under the tradename of Amberlite La-2. In this three-stage system, each stage involves thoroughly mixing the organic and aqueous phases, then separating them by centrifugation. Regenerated amine is introduced into the third stage, progressing to the second stage and finally the first stage in accordance with standard extraction practice. The phosphoric acid-potassium chloride mixture enters the first stage and progresses to the second and third stages in turn. As the HCl is extracted from the slurry entering the first stage, more KCl dissolves; thus there is essentially no solid phase exiting the second stage.

The aqueous phase exiting the third stage is a solution of monobasic and dibasic potassium orthophosphate. This solution can be treated by conventional means, such as by drying in a spray dryer, to recover the solid product (30.5 parts) as the orthophosphate, analyzing 45.6% $P_2O_5$, 45.5% $K_2O$, 0.15% $Cl^-$. This solid can be dissolved to make a desirable fertilizer solution, since it has an N–K–P ratio of 0–1–1.

The organic phase from the first stage is treated with 93.2 parts of lime slurry containing 10% CaO and washed with water. The phases are separated and the organic phase recycled to the third extraction stage. The aqueous phase, containing calcium chloride, is discarded.

EXAMPLE 2

A complete fertilizer material was prepared as follows: 146.5 grams wet process phosphoric acid (29% $P_2O_5$ and <0.2% $Cl^-$) was mixed with 22.1 grams KCl (62% $K_2O$). The resultant mixture was extracted with 772.25 grams of a 15% solution of the amine extractant of Ex. 1 in kerosene, in three equal portions. The aqueous phase effluent was evaporated and ammoniated with 15.3 grams anhydrous $NH_3$, producing 100 grams dry product analyzing 12.6% N, 42.5% $P_2O_5$ and 14.1% $K_2O$. This product can be granulated or prilled to make a high analysis, low chloride (<0.2% $Cl^-$) complete fertilizer material.

EXAMPLE 3

The procedure of Example 1 was repeated, with the aqueous phase exiting the third extraction stage being separated. This solution was then converted to potassium tripolyphosphate by the following procedure:

0.132 parts KOH were added for each part $P_2O_5$ in the solution. The resultant mixture was dried and then heated to 450° C. for about 60 min. The cooled product contained 52.4% $K_2O$, 47.3% $P_2O_5$ and <0.2% $Cl^-$.

The analogous sodium tripolyphosphate was prepared by using an equivalent amount of NaCl to replace the KCl in the first part of the procedure, and then later adding 0.095 part NaOH per part $P_2O_5$ in the solution. This mixture was then dried and heat treated yielding a product analyzing 42.0% $Na_2O$, 57.7% $P_2O_5$ and <0.2% $Cl^-$.

Therefor I claim:

1. A method for preparing a mixture of alkali metal phosphates having the general formula $M_{1.5}H_{1.5}PO_4$, where M= sodium or potassium, and characterized by a reduced chloride content, which comprises:

a. reacting sodium chloride or potassium chloride with phosphoric acid containing from about 5 weight percent to about 62 weight percent $P_2O_5$, in a molar ratio of 2 phosphoric acid to 3 sodium or potassium chloride, and forming hydrogen chloride, b. treating the mixture of step (a) with an immiscible organic secondary amine having the general formula $R_1R_2NH$, where $R_1$ is an aliphatic chain containing from 11 to 14 carbon atoms and bonded to the nitrogen atom by a tertiary carbon atom and $R_2$ is a straight chain saturated alkyl group containing about 12 carbon atoms in at least a stoichiometric ratio of amine with the formed hydrogen chloride, wherein said amine extracts hydrogen chloride from the mixture, and c. separating the treated phosphate solution from the amine.

2. A method according to claim 1 in which the amine extractant is dissolved in an inert solvent, the amine concentration varying from about 1 to about 99 percent.

3. A method according to claim 1 in which the amine contacts the alkali metal phosphate solution in a counter-current extraction process.

4. A method for preparing high analysis, low chloride, complete fertilizer which comprises:
   a. reacting potassium chloride with phosphoric acid containing from about 5 weight percent to about 62 weight percent $P_2O_5$, in a molar ratio of 2 phosphoric acid to 3 potassium chloride, and forming hydrogen chloride,
   b. treating the mixture of step (a) with an immiscible organic secondary amine having general formula $R_1R_2NH$, where $R_1$ is an aliphatic chain containing from 11 to 14 carbon atoms and bonded to the nitrogen atom by tertiary carbon atom and $R_2$ is a straight chain saturated alkyl group containing bout 12 carbon atoms in at least a stoichiometric ratio of amine with the formed hydrogen chloride, wherein said amine extracts hydrogen chloride from the mixture,
   c. separating the treated potassium phosphate solution from the amine, and
   d. ammoniating the potassium phosphate.

5. A method according to claim 4 in which the amine contacts the alkali metal phosphate solution in a countercurrent extraction process.

6. A method according to claim 4 in which the amine extractant is dissolved in an inert solvent, the amine concentration varying from about 1% to about 99%.

7. A method for preparing alkali metal tripolyphosphates having the general formula $M_5P_3O_{10}$, where M is sodium or potassium, which comprises:
   a. reacting sodium chloride or potassium chloride with phosphoric acid containing from about 5 weight percent to about 62 weight percent $P_2O_5$, in a molar ratio of 2 phosphoric acid to 3 sodium or potassium chloride, and forming hydrogen chloride,
   b. treating the mixture of step (a) with an immiscible organic secondary amine having the general formula $R_1R_2NH$, where $R_1$ is an aliphatic chain containing from 11 to 14 carbon atoms and bonded to the nitrogen atom by a tertiary carbon atom and $R_2$ is a straight chain saturated alkyl group containing about 12 carbon atoms at least in a stoichiometric ratio of amine with the formed hydrogen chloride, wherein said amine extracts hydrogen chloride from the mixture, resulting in a solution of approximately one part of mono-M phosphate and approximately one part of di-M phosphate in the non-organic phase,
   c. separating the resultant phosphate solution from the amine,
   d. adding sufficient $M_2O$, MOH or $M_2CO_3$ to the solution of step (c) to change the $MH_2PO_4$: $M_2HPO_4$ ratio from approximately 1:1 to approximately 1:2, and
   e. drying and calcining the phosphate mixture of step (d).

8. A method according to claim 4 in which the phosphate mixture is calcined at a temperature of from about 300° C. to about 600° C.

9. A method according to claim 7 in which the amine contacts the alkali metal phosphate solution in a countercurrent extraction process.

10. A method according to claim 7 in which the amine extractant is dissolved in an inert solvent, the amine concentration varying from about 1 to about 99 percent.

* * * * *